United States Patent
Shimura et al.

[11] Patent Number: 6,014,284
[45] Date of Patent: *Jan. 11, 2000

[54] SIGNAL REPRODUCING APPARATUS HAVING ROTARY HEADS ROTATING 180° OUT OF PHASE AND PRODUCING SIGNALS FOR TRACKING CONTROL

[75] Inventors: Yukio Shimura, Gunma-ken; Nobutoshi Takayama, Kanagawa-ken, both of Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/562,902

[22] Filed: Nov. 27, 1995

[30] Foreign Application Priority Data

Nov. 30, 1994 [JP] Japan .................... 6-297630

[51] Int. Cl.⁷ .................................................. G11B 5/584
[52] U.S. Cl. .......................................... 360/77.14; 386/79
[58] Field of Search ............................ 360/77.14, 77.12, 360/73.11, 73.12, 70, 77.13, 77.15; 386/78, 79, 80

[56] References Cited

U.S. PATENT DOCUMENTS

| | | |
|---|---|---|
| 4,141,048 | 2/1979 | Kubota et al. .................... 360/77.14 |
| 4,597,023 | 6/1986 | Rijckaert ............................ 360/77.14 |
| 5,469,304 | 11/1995 | Sakakibara ...................... 360/77.14 X |
| 5,490,017 | 2/1996 | Nakamura ........................ 360/77.14 X |
| 5,510,938 | 4/1996 | Sakakibara ...................... 360/77.12 X |
| 5,751,890 | 5/1998 | Yamasaki et al. ........................ 386/79 |

FOREIGN PATENT DOCUMENTS 83945 4/1988 Japan ................................ 360/77.14

Primary Examiner—Aristotelis M. Psitos
Assistant Examiner—Alan Faber
Attorney, Agent, or Firm—Robin, Blecker & Daley

[57] ABSTRACT

A signal reproducing apparatus is arranged to have two reproduced signals reproduced from a plurality of tracks formed on a magnetic medium by two rotary heads arranged to rotate 180 degrees out of phase with each other and which trace positions shifted from each other, to extract, from the two reproduced signals, two signals having respective different levels used for tracking control, and to perform tracking control by using the two extracted signals to cause the heads to trace positions shifted from a predetermined track. The arrangement enables the heads to stably trace track positions shifted from positions to be traced in the normal reproduction.

25 Claims, 4 Drawing Sheets

SIGNAL REPRODUCING APPARATUS HAVING ROTARY HEADS ROTATING 180° OUT OF PHASE AND PRODUCING SIGNALS FOR TRACKING CONTROL

BACKGROUND OF THE INVENTION

1. Field of the Invention

This invention relates to a signal reproducing apparatus, and more particularly to a signal reproducing apparatus arranged to be capable of performing tracking control in reproducing signals from a recording medium on which tracks are formed.

2. Description of the Related Art

Reproduction tracking control methods which have heretofore been put in practice for home VTRs include methods called a CTL method and a 4f ATF method. According to the CTL method, a fixed magnetic head is disposed at a part of a tape path separately from a rotary head. The fixed magnetic head is arranged to record, as a CTL signal, a vertical synchronizing signal separated from a video signal in a control track provided in the longitudinal direction of a tape. At the time of reproduction, the CTL signal is reproduced and used for tracking. In the case of the 4f ATF method, a rotary head which is arranged to record and reproduce a main signal including a video signal and an audio signal is used to record pilot signals of four different relatively-low frequencies by superimposing them on the main signal in rotation in a circulating manner, and, at the time of reproduction, a tracking error signal (ATF error signal) is obtained by comparing with each other crosstalk components of the pilot signals reproduced from two tracks adjoining the track which is being subjected to reproduction.

Home VTRs have recently come to be arranged to give high quality images and to operate in a digital manner. As a result, for recording and reproducing a relatively large amount of information, some of digital VTRs have been arranged to divide an image signal for one frame and to record the divided image signals in a plurality of tracks. Studies are now conducted for various tracking methods applicable to the digital VTRs of that kind.

With respect to reproduction tracking control, in cases where tape path adjustment, tag recording, after-recording, insert recording, etc., are to be made, it has been practiced to make a so-called tracking shift by intentionally shifting the phase of the rotary head relative to tracks.

There has been proposed a 2f ATF method which differs from the above-stated 4f ATF method. According to the 2f ATF method, pilot signals are recorded in every other track. More specifically, a pilot signal of a frequency f1 and a pilot signal of a frequency f2 are alternately recorded in every other track. Hence, no pilot signal is recorded in every other track on the tape.

In carrying out reproduction tracking control in accordance with the 2f ATF method, a tracking error signal is obtained only from the pilot signals of frequencies f1 and f2 recorded in two adjacent tracks reproduced by one of two rotary heads, i.e., a head of a first channel, which is reproducing tracks in which no pilot signal is recorded. The other rotary head, i.e., a head of a second channel, on the other hand, has no pilot signal reproduced in two adjacent tracks and reproduces tracks having the pilot signals recorded.

With respect to the above-stated tracking shift, the CTL method is very easily carried out. In other words, the tracking control is performed on the basis of a phase difference between a CTL signal reproduced and a rotary-head rotation phase detection signal. Therefore, the tracking shift can be carried out as desired by switching the delay time of either the CTL signal or the rotary-head rotation phase detection signal. In the case of the above-stated method of using the pilot signals, on the other hand, the concept of carrying out a simple tracking shift such as the one used by the CTL method has not been taken into consideration.

SUMMARY OF THE INVENTION

In view of the background situation described, it is an object of this invention to provide a signal reproducing apparatus which is capable of carrying out a tracking shift in a simple manner.

To attain this object, a signal reproducing apparatus which is an embodiment of this invention is arranged to extract two signals having respective different levels used for tracking control from two reproduced signals obtained by tracing two positions shifted from each other, and to perform tracking control by using both of the two extracted signals.

The above and other objects and features of this invention will become apparent from the following detailed description of an embodiment thereof taken in connection with the accompanying drawings.

DETAILED DESCRIPTION OF THE PREFERRED EMBODIMENT

Figure 1:
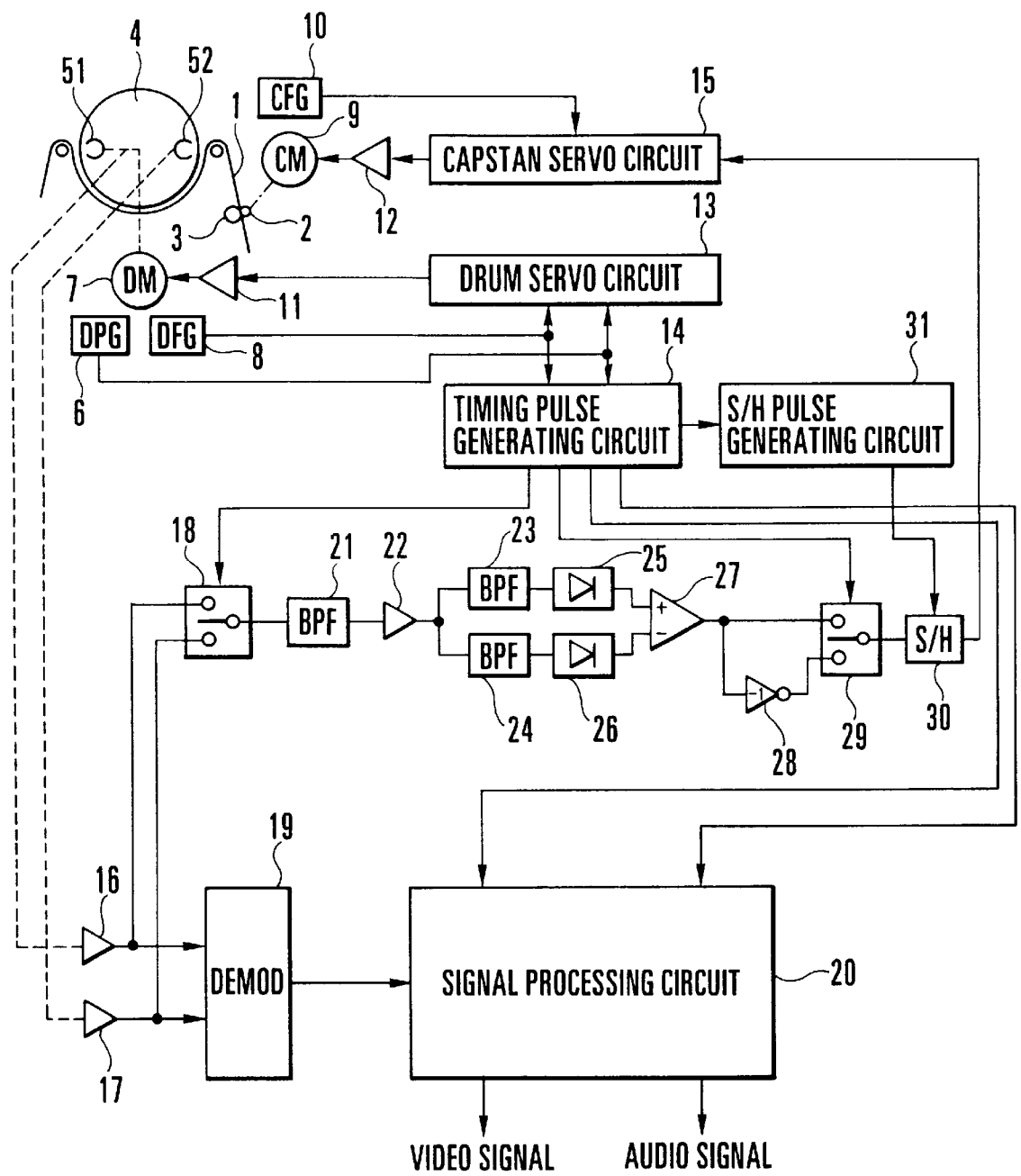
FIG. 1 is a block diagram showing in outline the whole arrangement of a signal reproducing apparatus which is arranged as an embodiment of this invention.

FIG. 1 to FIGS. 3(a) to 3(e) are drawings aiming at explaining an embodiment of this invention. FIG. 1 shows in a block diagram a reproducing system of a digital VTR which employs the 2f ATF method. FIGS. 2(a) to 2(e) are timing charts showing the waveforms of signals obtained from various parts of the digital VTR shown in FIG. 1. FIGS. 3(a) to 3(e) are explanatory diagrams showing a tracking shift made according to a phase discrepancy between the head and the track.

Referring to FIG. 1, the illustration includes a magnetic tape 1, a capstan 2, a pinch roller 3, a rotary drum 4, and rotary heads 51 and 52 provided on the drum 4. The rotary head 51 is referred to as a channel-1 head and the rotary head 52 is referred to as a channel-2 head. A PG sensor 6 is arranged to detect the rotation phase of the rotary drum 4. A drum motor 7 is arranged to rotate the rotary drum 4. An FG sensor 8 is arranged to detect the rotational frequency of the drum motor 7. A capstan motor 9 is connected to the capstan 2. An FG sensor 10 is arranged to detect the rotational frequency of the capstan motor 9. A driving circuit 11 is arranged to drive the drum motor 7. A driving circuit 12 is arranged to drive the capstan motor 9. A drum servo circuit 13 is arranged to control the drum motor 7. A timing pulse generating circuit 14 is arranged to generate timing pulses of varied kinds in synchronism with the rotation of the drum 4 on the basis of the detection outputs of the sensors 6 and 8. A capstan servo circuit 15 is arranged to control the capstan motor 9.

Reproduction amplifiers 16 and 17 are arranged to amplify the outputs of the heads 51 and 52. A switch 18 is arranged to select one of reproduced signals from the reproduction amplifiers 16 and 17. A demodulation circuit 19 is arranged to demodulate, in accordance with the timing pulses, the reproduced signal which was modulated in recording. A signal processing circuit 20 is arranged to perform various processes including a process of correcting an error of time base correction, an expanding process, etc., to D/A convert signals thus processed into original video and audio signals and to output the D/A converted signals to the outside of the reproducing system.

A band-pass filter (BPF) 21 is provided for extracting a frequency band including pilot signals of a plurality of kinds from the reproduced signal selected by the switch 18. An amplifier 22 is arranged to amplify the reproduced pilot signals extracted by the BPF 21. A BPF 23 is provided for extracting a frequency component f2 from the reproduced pilot signals. Another BPF 24 is provided for extracting a frequency component f1 from the reproduced pilot signals. A detection circuit 25 is arranged to convert the frequency component f2 into a DC signal. Another detection circuit 26 is arranged to convert the frequency component f1 into a DC signal. A differential amplifier circuit 27 is arranged to receive the detection outputs of the two detection circuits 25 and 26. An inversion circuit 28 is connected to the output of the differential amplifier circuit 27. A switch 29 is arranged to switch the pilot signal rotation by switching the output of the differential amplifier circuit 27 and the output of the inversion circuit 28 from one over to the other. A sample-and-hold (S/H) circuit 30 is arranged to sample and hold the signal outputted from the switch 29. An S/H pulse generating circuit 31 is arranged to generate, on the basis of the timing pulses from the timing pulse generating circuit 14, S/H timing pulses to be used for offset tracking as desired.

The VTR shown in FIG. 1 is assumed to include a recording system which is not shown but is arranged to record a video signal, an audio signal, and pilot signals of two different frequencies f1 and f2.

At the time of recording, the above-stated recording system causes the channel-1 head 51 to record only a main signal by tracing a track f0 which is one of tracks 32 on the tape 1 and which has no pilot signal recorded therein, as shown in FIG. 3(*a*). The channel-2 head 52 is caused to record the pilot signals of the frequencies f1 and f2 alternately in tracks f1 and f2 located on both sides of the track f0 along with the main signal.

Referring to FIGS. 2(*a*) to 2(*e*), reference numeral 101 denotes a head switching pulse signal (HSW) which is used for selection of the reproducing head 51 or 52 according to the rotation of the drum 4. Reference numeral 102 denotes an ATFSW pulse signal which is used for switching the pilot signal rotation for ATF (automatic track finding). Reference numeral 103 denotes a reproduced signal 1 which includes the main signal and the pilot signals reproduced by the channel-1 head 51. Reference numeral 104 denotes a reproduced signal 2 which includes the main signal and the pilot signals reproduced by the channel-2 head 52. Reference numeral 105 denotes a tracking error signal (ATF error signal) which is obtained by selecting and processing the pilot signals reproduced by the channel-1 head 51 and the channel-2 head 52. Reference numeral 106 denotes an S/H timing signal which is used for sampling the tracking error signal 105.

The VTR which is arranged according to this invention as described above operates as follows.

At the time of reproduction, signals recorded on the tape are reproduced by the channel-1 head 51 and the channel-2 head 52. The signals reproduced are amplified by the reproduction amplifiers 16 and 17 to become reproduced signals. The reproduced signal from the channel-1 head 51 is obtained from the amplifier 16. The reproduced signal from the channel-2 head 52 is obtained from the amplifier 17.

These reproduced signals are divided and supplied to an ATF (automatic track finding) system and a signal processing system. In the signal processing system, the reproduced signals are digital-demodulated by the demodulation circuit 19. The demodulated signals are supplied to the signal processing circuit 20 to be subjected to a time-base correction process, an error correction process, an expanding process, etc. The processed signals are D/A (digital-to-analog) converted into original video and audio signals before they are outputted to the outside.

In the ATF system, the reproduced signal from the channel-1 head 51 or the reproduced signal from the channel-2 head 52 is selected by the switch 18. The signal thus selected is applied to the BPF 21 to have the pilot signals extracted. The pilot signals thus extracted are amplified by the amplifier 22. The amplified pilot signals are applied to the BPF 23 to extract the frequency component f2 and also to the BPF 24 to extract the frequency component f1. The pilot signals of the frequency components f2 and f1 are subjected to the detection process of the detection circuits 25 and 26, respectively, to be converted into DC signals.

The DC signals are supplied to the differential amplifier 27 to be converted into a tracking error signal which represents a level difference between the DC signal of the frequency component f1 and the DC signal of the frequency component f2. This tracking error signal consists of first and second tracking error signals which correspond respectively to the channel-1 head 51 and the channel-2 head 52. The tracking error signal and a signal obtained by inverting the tracking error signal by means of the inversion circuit 28 are selectively outputted through the switch 29. The S/H circuit 30 then samples the tracking error signal according to the S/H pulses generated by the S/H pulse generating circuit 31. The sampled tracking error signal is supplied to the capstan servo circuit 15.

In carrying out tracking shift control according to this invention, the VTR operates as described below with reference to FIGS. 2(*a*) to 2(*e*) and FIGS. 3(*a*) to 3(*e*).

The switch 18 is controlled by the HSW pulse signal 101 shown in FIGS. 2(*a*) to 2(*e*), which is obtained from the timing pulse generating circuit 14 shown in FIG. 1. The switch 18 is thus controlled to select either the reproduced signal 1 (103) which is an output of the channel-1 head 51 obtained from the reproduction amplifier 16 or the reproduced signal 2 (104) which is an output of the channel-2 head 52 obtained from the reproduction amplifier 17.

These reproduced signals 103 and 104 are subjected to ATF processing as mentioned above to obtain the tracking error signal 105 from the switch 29. The ATFSW pulse signal 102 which is used for switch the switch 29 is outputted from the timing pulse generating circuit 14 so as to switching the output of the differential amplifier circuit 27 and the inverted output thereof, since the polarities of the reproduced pilot signals are inverted for every two tracks. The tracking error signal 105 is sampled by the S/H circuit 30 in accordance with the S/H timing pulse signal 106 outputted from the S/H pulse generating circuit 41. The tracking error signal thus sampled is used for control over the tracking action of the capstan servo circuit 15.

Figure 2A:
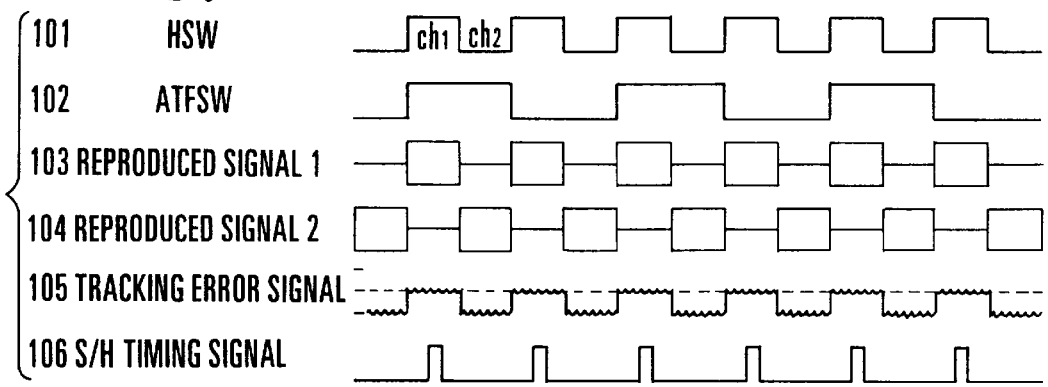
FIGS. 2(a) to 2(e) are timing charts showing the waveforms of signals obtained from various parts of the apparatus shown in FIG. 1.
Figure 2B:
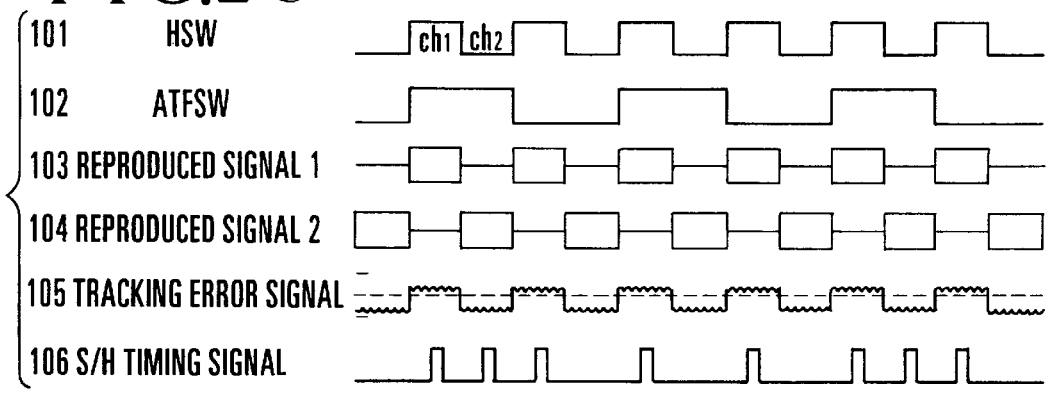
Figure 2C:
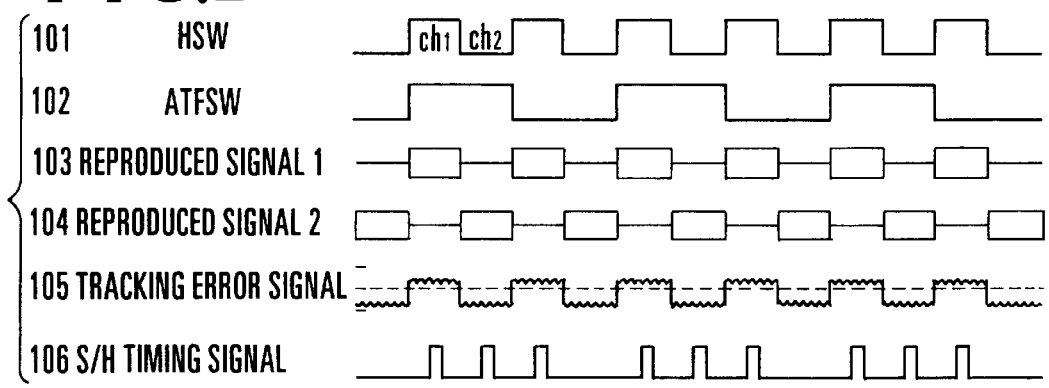
Figure 2D:
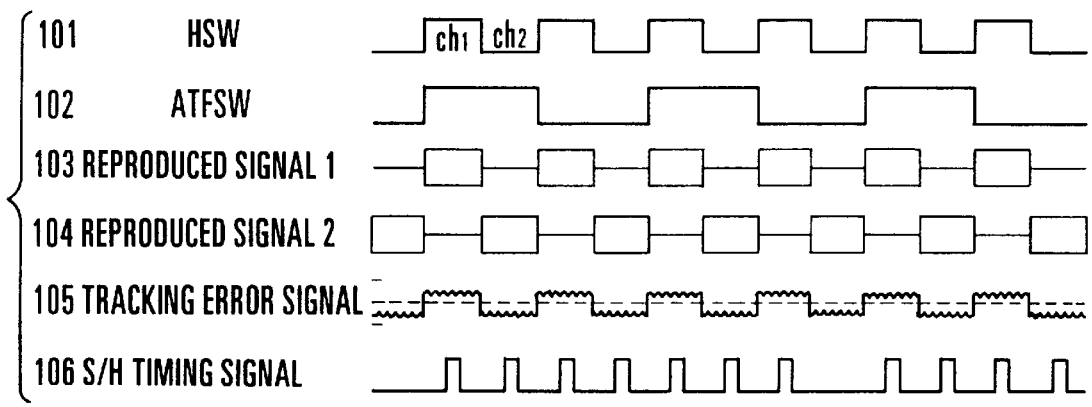
Figure 2E:
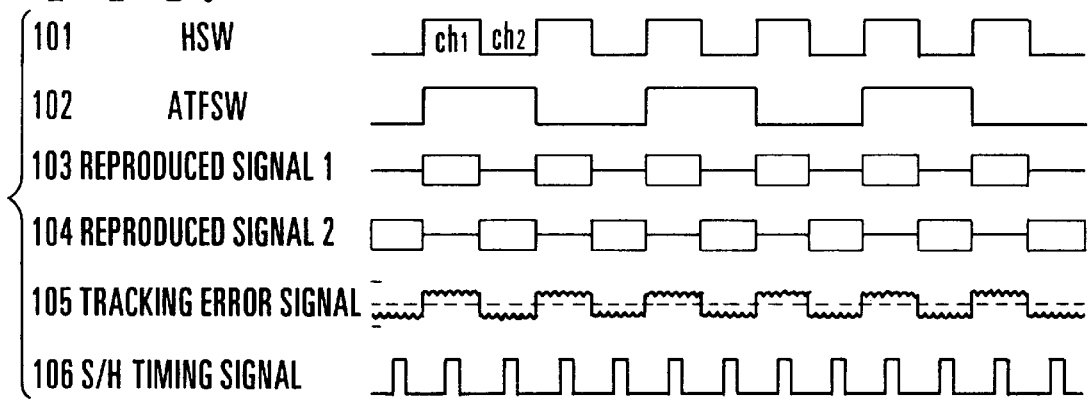
Figure 3A:
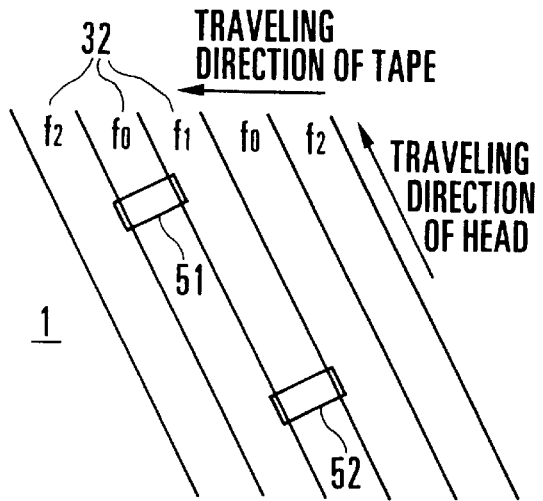
FIGS. 3(a) to 3(e) show the track tracing states of heads which are obtained on a recording medium and which correspond respectively to FIGS. 2(a) to 2(e).

Among the FIGS. 2(a) to 2(e) and FIGS. 3(a) to 3(e), FIGS. 2(a) and 3(a) show a case where only the tracking error signal obtained from the channel-1 head 51 is used and show a state of normal 100% tracking, i.e., tracking without any phase discrepancy between the head and the track. In other words, FIGS. 2(a) and 3(a) show a state obtained at the time of normal reproduction.

Figure 3B:
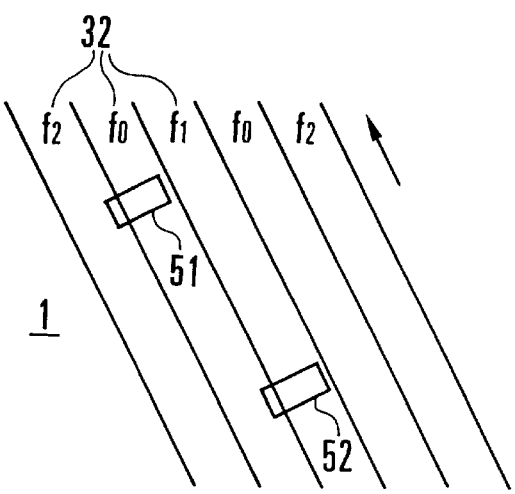

FIGS. 2(b) and 3(b) show an 80% tracking state, in which a tracking error signal employed is obtained by mixing two tracking error signals, i.e., the tracking error signal obtained from the channel-1 head 51 and a signal obtained by sampling once per four times the tracking error signal obtained from the channel-2 head 52.

Figure 3C:
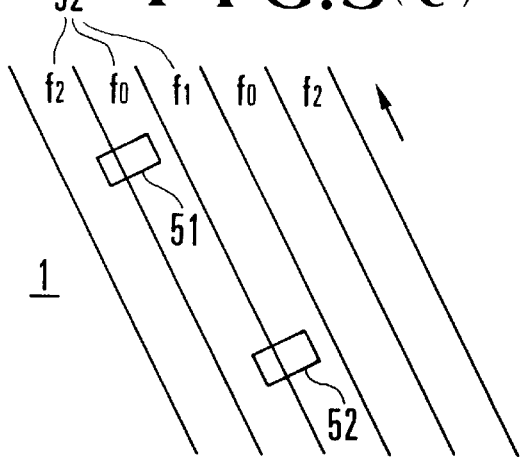

FIGS. 2(c) and 3(c) show a 67% tracking state, in which a tracking error signal employed is obtained by mixing two tracking error signals, i.e., the tracking error signal obtained from the channel-1 head 51 and a signal obtained by sampling twice per four times the tracking error signal obtained from the channel-2 head 52.

Figure 3D:
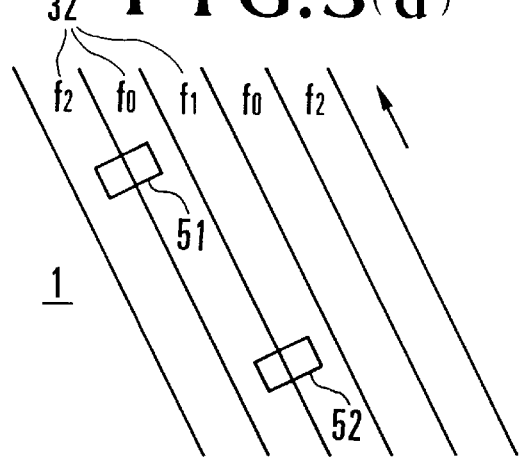

FIGS. 2(d) and 3(d) show a 57% tracking state, in which a tracking error signal employed is obtained by mixing two tracking error signals, i.e., the tracking error signal obtained from the channel-1 head 51 and a signal obtained by sampling three times per four times the tracking error signal obtained from the channel-2 head 52.

Figure 3E:
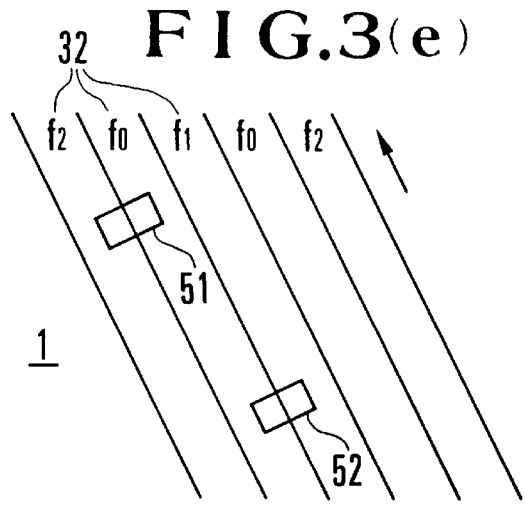

FIGS. 2(e) and 3(e) show a 50% tracking state, in which a tracking error signal employed is obtained by mixing two tracking error signals, i.e., the tracking error signal obtained from the channel-1 head 51 and, every time, the tracking error signal obtained from the channel-2 head 52.

The embodiment described above performs normal tracking control by using only the tracking error signal obtained from the channel-1 head 51. The embodiment is, however, arranged to be capable of carrying out a stable tracking shift by mixing the two tracking error signals obtained from the channel-1 head 51 and the channel-2 head 52 at an arbitrary rate of mixing.

With the embodiment arranged, as described above, the tracking control which normally uses only the tracking error signal obtained from the channel-1 head 51 is arranged to use also the tracking error signal obtained from the channel-2 head 52 by mixing the two tracking error signals at an arbitrary rate. This arrangement enables the embodiment to stably carry out the tracking shift even in the case of the 2f ATF method. The arrangement, therefore, facilitates tracking control over lower edge tracking for tape path adjustment, tag recording, after-recording, and insert recording.

Further, the embodiment described is arranged to sample the tracking error signals obtained from signals reproduced by the heads and to mix the tracking error signals at a desired rate by supplying them to the capstan driving circuit with the ratio of sampling them variously changed. However, this arrangement may be changed to separately sample the two tracking error signals and, after that, to directly mix them by adding them by means of an addition circuit.

What is claimed is:

1. A signal reproducing apparatus, comprising:
   a) head means for reproducing signals from a recording medium on which a plurality of tracks are formed in parallel, said head means including two rotary heads arranged to rotate with a phase difference of 180 degrees from each other;
   b) extracting means for extracting two signals having different levels used for tracking control from two reproduced signals respectively reproduced by causing said head means to trace positions which are shifted from each other; and
   c) tracking control means for causing said head means to trace a position shifted from a predetermined track by performing tracking control using both said two signals extracted by said extracting means in one tracking control performance, said tracking control means having another tracking control performance using one and not the other of said two signals.

2. An apparatus according to claim 1, wherein said two heads trace positions shifted from each other as much as one track pitch, and wherein said extracting means is arranged to extract said two signals from outputs of said two heads.

3. An apparatus according to claim 2, wherein said two signals respectively indicate amounts of deviation in position of said two heads with respect to two tracks located adjacent to each other.

4. An apparatus according to claim 3, wherein said plurality of tracks have pilot signals recorded in every other track in a state of being superimposed on information signals, wherein the pilot signals are two kinds of pilot signals having respective different frequencies and are respectively recorded in a cycle of four tracks, and wherein said two signals are obtained by comparing reproduction levels of the two kinds of pilot signals.

5. An apparatus according to claim 1, wherein said tracking control means includes sampling means for respectively sampling said two signals.

6. An apparatus according to claim 5, further comprising transport means for transporting the recording medium in a direction of intersecting the tracks, and driving means for driving said transport means, wherein said tracking control means is arranged to supply outputs of said sampling means to said driving means.

7. An apparatus according to claim 5, wherein said tracking control means is capable of controlling said sampling means to vary a ratio of respective samplings of said two signals by said sampling means.

8. An apparatus according to claim 5, wherein said sampling means is arranged to sample said two signals time-divisionally.

9. A signal reproducing apparatus, comprising:
   a) two heads arranged to trace positions shifted from each other by one track on a recording medium on which a plurality of tracks are formed in parallel, said two heads being rotary heads arranged to rotate with a phase difference of 180 degrees from each other;
   b) extracting means for extracting, from two reproduced signals respectively obtained by said two heads, two signals indicating respective deviations in position of said two heads with respect to a predetermined track; and
   c) tracking control means for performing tracking control by using said two signals extracted by said extracting means in one tracking control performance, said tracking control means having another tracking control performance using one and not the other of said two signals.

10. An apparatus according to claim 9, wherein said tracking control means is arranged to cause said two heads to trace positions respectively shifted from a predetermined track.

11. An apparatus according to claim 9, wherein said plurality of tracks have pilot signals recorded in every other track in a state of being superimposed on information signals, wherein the pilot signals are two kinds of pilot signals having respective different frequencies and are respectively recorded in a cycle of four tracks, and wherein said two signals are obtained by comparing reproduction levels of the two kinds of pilot signals.

12. An apparatus according to claim 9, wherein said tracking control means includes sampling means for selectively sampling said two signals.

13. An apparatus according to claim 12, wherein said tracking control means is capable of controlling said sampling means to vary a ratio of respective samplings of said two signals by said sampling means.

14. A signal reproducing method, comprising the steps of:

reproducing signals from a recording medium on which a plurality of tracks are formed in parallel by causing two heads to trace positions shifted from each other, said two heads being rotary heads arranged to trace positions shifted from each other by one track and to rotate with a phase difference of 180 degrees from each other;

extracting, from two reproduced signals respectively reproduced by said two heads, two signals having different levels used for tracking control; and causing said two heads to trace positions shifted from a predetermined track by performing tracking control in one tracking control performance by use of one and not the other of said two signals extracted and another tracking control performance using the two signals extracted.

15. A method according to claim 14, wherein said two signals are signals respectively indicating deviations in position of said two heads with respect to two tracks located adjacent to each other.

16. A method according to claim 15, wherein said plurality of tracks have pilot signals recorded in every other track in a state of being superimposed on information signals, wherein the pilot signals are two kinds of pilot signals having respective different frequencies and are respectively recorded in a cycle of four tracks, and wherein said two signals are obtained by comparing reproduction levels of the two kinds of pilot signals.

17. A method according to claim 14, wherein said tracking control is performed by using signals obtained by respectively sampling said two signals.

18. A method according to claim 17, further comprising a step of supplying said sampled signals to a driving means for driving the recording medium in a direction of intersecting the tracks.

19. A method according to claim 17, wherein, the sampling step may be practiced with any one of plural different ratios of respective samplings of said two signals.

20. A method according to claim 14, wherein said two signals are selectively sampled by a single means.

21. A signal reproducing method, comprising the steps of:

obtaining two reproduced signals by respectively reproducing signals by two heads arranged to trace positions shifted from each other by one track on a recording medium on which a plurality of tracks are formed in parallel, said two heads being rotary heads arranged to rotate with a phase difference of 180 degrees from each other;

extracting, from the two reproduced signals, two signals indicating deviations in position of said two heads with respect to a predetermined track; and performing tracking control in one tracking control performance by use of one and not the other of said two signals extracted and in another tracking control performance using the two signals extracted.

22. A method according to claim 21, wherein said tracking control is performed to cause said two heads to trace positions respectively shifted from a predetermined track.

23. A method according to claim 21, wherein said plurality of tracks have pilot signals recorded in every other track in a state of being superimposed on information signals, wherein the pilot signals are two kinds of pilot signals having respective different frequencies and are respectively recorded in a cycle of four tracks, and wherein said two signals are obtained by comparing reproduction levels of the two kinds of pilot signals.

24. A method according to claim 21, wherein said two signals are selectively sampled by a single means.

25. A method according to claim 24, wherein, the sampling step may be practiced with any one of plural different ratios of respective samplings of said two signals.

* * * * *